United States Patent
Agarwal et al.

[11] Patent Number: 5,295,698
[45] Date of Patent: Mar. 22, 1994

[54] MOLDED PLASTIC GASKET HAVING AN IMPROVED SEALING BEAD

[75] Inventors: Bhagwan D. Agarwal, Skokie; Colin Chen, Barrington, both of Ill.

[73] Assignee: Fel-Pro Incorporated, Skokie, Ill.

[21] Appl. No.: 74,990

[22] Filed: Jun. 10, 1993

Related U.S. Application Data

[63] Continuation of Ser. No. 11,264, Jan. 29, 1993, abandoned.

[51] Int. Cl.[5] ............................................. F16J 15/14
[52] U.S. Cl. ................................. 277/235 B; 277/180; 277/211
[58] Field of Search ................. 277/235 B, 180, 211, 277/207 R; 123/52 M

[56] References Cited

U.S. PATENT DOCUMENTS

| | | | |
|---|---|---|---|
| 2,058,010 | 10/1936 | Fitch | 277/211 |
| 3,191,950 | 6/1965 | Hiltner | 277/180 |
| 4,516,784 | 5/1985 | Merz | 277/235 B X |
| 4,796,897 | 1/1989 | Inciong | 277/235 B X |
| 4,817,967 | 4/1989 | Belter | 277/235 B X |
| 4,817,969 | 4/1989 | McDowell et al. | 277/235 B |
| 5,033,189 | 7/1991 | Desverchere et al. | 277/235 B X |
| 5,228,702 | 7/1993 | Browne et al. | 277/180 X |

FOREIGN PATENT DOCUMENTS 2123904  2/1984  United Kingdom ............ 277/207 R Primary Examiner—William A. Cuchlinski, Jr.
Assistant Examiner—John L. Beres

[57] ABSTRACT

A plastic gasket having a main body and an integrally formed sealing bead surrounding a service opening. The sealing bead is vertically moveable relative to the gasket body and has a first segment which projects above the main body and a second segment which is in line with the first segment and which is spaced inwardly of the main body. Integral reduced thickness cantilever sections join the sealing beads to the main body and cooperate with the beads to provide restorative energy under loading.

8 Claims, 1 Drawing Sheet

MOLDED PLASTIC GASKET HAVING AN IMPROVED SEALING BEAD

This application is a continuation of application Ser. No. 08/11,264, filed Jan. 29, 1993, now abandoned.

BACKGROUND OF THE INVENTION

The present invention relates to molded gaskets, and especially to high temperature-resistant molded plastic gaskets for use in connection with automotive engines and in other environments where similar severe service conditions are encountered.

A wide variety of gaskets have been suggested in the prior art for automotive and other uses. Some such gaskets have been molded of high temperature plastics and have used sealing beads to enhance their sealing characteristics. For example, in U.S. Pat. No. 4,817,969 a molded, fiber filled plastic gasket has sealing beads which are integrally formed with the gasket body. Sealing beads of the types there illustrated are not necessarily the most effective in some gasketing environments, and especially in those in which the flanges to be sealed have substantial warpage, or where substantial variations in the spacing between the flanges to be sealed may occur because of the positioning of the bolts or studs clamping the flanges to each other or for other reasons.

It would be desirable to provide improved gaskets for sealing joints, such as joints in automotive engines, and in particular to provide molded plastic gaskets having improved, integrally formed beads which function to seal without requiring excessively high clamping loads, which are adapted for use in a wide variety of environments, which are adapted for use with imprecise sealing flanges, and which will accommodate to substantial variations in applied clamping loads.

SUMMARY OF THE INVENTION

Gaskets, such as intake manifold gaskets, in accordance with the present invention comprise a thin main gasket body of a synthetic plastic material having a pair of expansive main surfaces and defining a plurality of openings including at least one service opening and a plurality of bolt holes. The gasket body defines a sealing bead integral with the body which is vertically moveable relative to the body and which surrounds each service opening. Each sealing bead comprises a first bead segment projecting outwardly beyond one of the main surfaces and a second bead segment integrally formed with the first bead segment in line with the first bead segment and extending oppositely to the first bead segment. Each sealing bead is formed integrally with the main body via a cantilever section at each side of the sealing bead with each cantilever section having a thickness no more than about 40 percent of the thickness of the main body and a width which is no less than about 75 percent of the thickness of the cantilever section, whereby when the gasket is clamped between a pair of flanges, the sealing bead segments cooperate to effect seals with the flanges thereat and the cantilever sections cooperate to provide restorative energy under loading.

Preferably, the cantilever section thickness is no more than about 30 percent of the thickness of the main body and the second bead segment is spaced inwardly of the other main surface by a distance equal to at least 5 percent of the thickness of the main body. Desirably, the total bead height is at least 15 percent greater than the thickness of the main body, the bead segments have free ends which are flat and parallel, and the gasket body is generally flat and is of a thickness of at least about 0.04 inch.

Further objects, features and advantages of the present invention will become apparent from the following drawings and description thereof.

DETAILED DESCRIPTION

Figure 1:
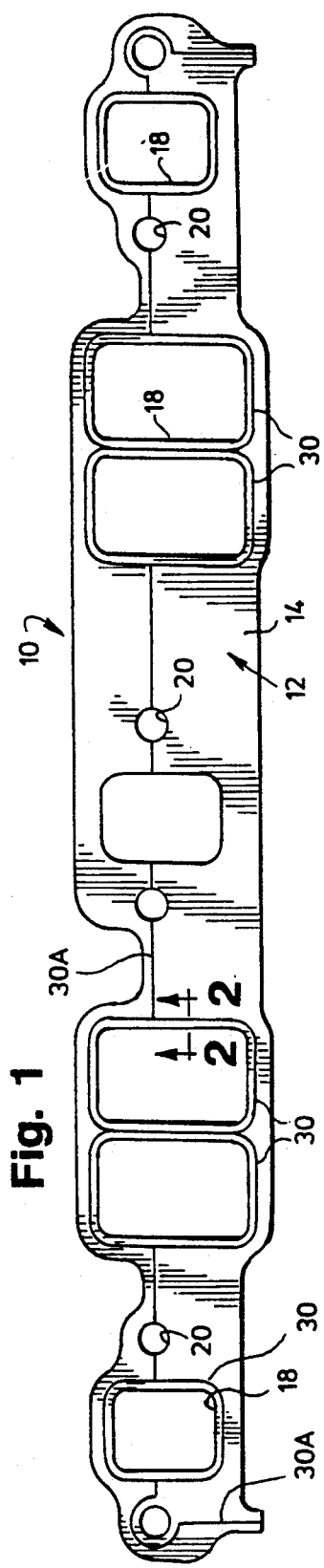
FIG. 1 is a top plan view of a gasket of the present invention.
Figure 2:
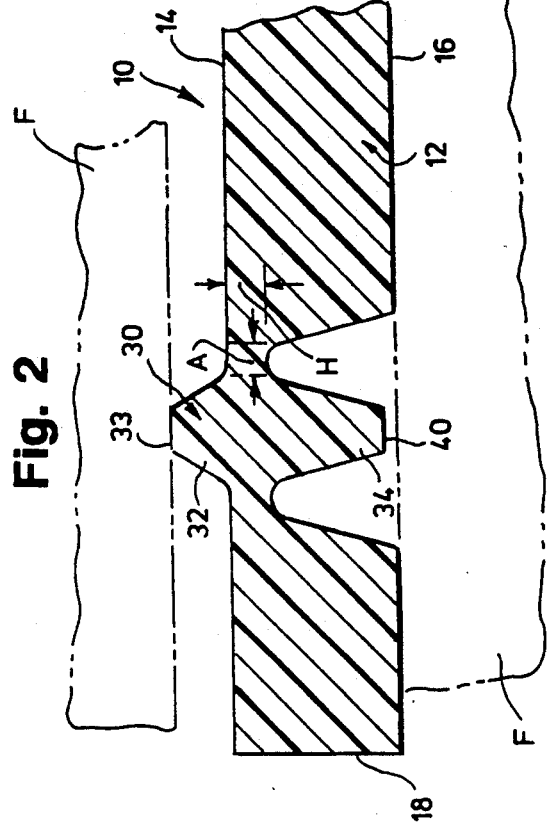
FIG. 2 is a cross-sectional view taken substantially along line 2—2 of FIG. 1.
Figure 3:
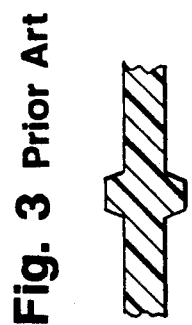
FIG. 3 shows a typical prior art bead configuration of the type disclosed in U.S. Pat. No. 4,817,969 for comparative purposes.

Referring now to FIGS. 1 and 2, an exemplary gasket 10 of the present invention is there shown. Gasket 10 is an intake manifold gasket which may be molded or otherwise formed of a plastic such as nylon. Gasket 10 is adapted for use in an automotive engine assembly in an environment where hot water or coolant flows and must accommodate ambient temperatures initially and then accommodate hot service temperatures.

Gasket 10 has a generally flat main body 12 having expansive upper and lower surfaces 14 and 16, respectively, and defines a plurality of service openings 18. Gasket 10 is adapted to be disposed between a pair of confronting flanges such as flat flanges F illustrated in dotted line in FIG. 2 and also defines further openings, such as bolt holes 20, for securing the gasket 10 between the flanges F, and via which the gasket 10 is loaded into a sealing relationship with the flanges F.

As best seen in FIG. 2, the main gasket body 12 defines a sealing bead means including continuous sealing beads 30 which surround the service openings 18. Beads 30 include a continuous, upwardly projecting first bead segment 32 which extends outwardly and above one main surface, such as surface 14, and further includes a continuous, downwardly projecting second bead segment 34 which projects toward the other, lower main surface 16. The height of beads 30 is substantially greater than the thickness of gasket body 12. The sealing bead means may also comprise sealing beads 30A which are like beads 30, but which are positioned elsewhere on the gasket for sealing other zones.

In a preferred form the sealing bead segments 32, 34 are trapezoidal in configuration. The free end face 40 of the bead segment 34 does not extend downwardly to main surface 16 prior to clamping of the gasket 10 between the pair of flanges F.

As illustrated in FIGS. 1 and 2, each sealing bead 30, 30A is integrally formed, as by molding, with the main body of gasket 10. Gasket 10 is of a synthetic plastic material, most preferably a thermoplastic material of which nylon is one example. A typical nylon suitable for molding exemplary gasket 10 is a nylon 66 available from Bay Resin as PA-113. Other nylons, as well as other plastics such as polypropylene, polyethersulfones, polyetherimides, etc., may be used as well, with or without fillers, such as of the types of fillers described in U.S. Pat. No. 4,817,969. Typical glass fiber fillers for nylon gaskets of the present invention have 10 percent and 32 percent fills.

As is clear from the drawings, beads 30, 30A are moveable vertically relative to the gasket main body 12 to seal against the confronting flanges F. When the flanges F are forced together bead segment 32 is displaced and forced downwardly, causing end face 40 of bead segment 32 to engage the lower flange F. Eventually end faces 40 and 33 (of bead segment 32) which are preferably flat and parallel are forced into sealing engagement with the flanges F to provide a seal around an opening 18.

As may be appreciated, bead 30, as it moves, may be viewed as moving about cantilever zones A which provide a hinging or cantilever function. Cantilever sections or zones A provide both for relative movement and restorative energy to accommodate relative micromotion and also allow elastic recovery of the beads, even if a bead itself has been plastically deformed when loaded into its sealing relationship and there is minimal material recovery potential available. Cantilever zones A tend to provide both static and dynamic sealing bead recovery.

In a preferred form the thickness or height H of a cantilever zone A should be no more than about 40 percent of the thickness of the main gasket body adjacent thereto and the width W of a cantilever zone should no less than about 75 percent of the thickness or height H of the cantilever zone. In the most preferred form the height H should be no more than about 30 percent of the thickness of the gasket body adjacent thereto. These will tend to assure suitable recovery by providing for restorative energy under loading.

A typical gasket of the present invention may have a main body 0.06 inch thick, a bead segment 32 height of 0.021 inch, an end face 33 having a width of 0.015 inch, a cantilever zone height of 0.015 inch, a bead segment 34 height of 0.041 inch, an end face 40 of 0.015 inch wide, and a spacing of end face 40 of 0.004 inch inwardly from main surface 16. Preferably the inward positioning of bead segment 32 should be at least 5 percent (5%) of the thickness of the main body and the total bead height should be at least 15 percent (15%) greater than the thickness of the main body. The main body thickness is preferably at least 0.04 inch. Other dimensions may be used depending upon the material used and the degree of recovery desired.

Gasket and bead configurations such as those shown in U.S. Pat. No. 4,817,969 are especially useful for plastic gaskets used in high sealing load environments. Plastic gaskets having the bead configurations, such as beads on and in typical embossments where the embossments and gasket bodies are of generally uniform thickness throughout, are especially effective for sealing where the flange land areas available are substantial and the flanges and loading are relatively uniform. However, where the available land areas are small and the sealing flanges are variable or may be warped, or where loading may not be uniform or consistent from one device to be sealed to the next, beads of the types described in this paragraph may not be fully satisfactory.

The bead arrangement of the present invention is much more conformable and therefore can more effectively seal irregular surfaces, which may be warped surfaces, or stampings. Where loading is non-uniform or irregular, the bead arrangement of the present invention will accommodate more effectively and will be more forgiving. With thicker plastic gasket bodies, say of 0.06 inch as compared to 0.03 inch, the land areas required for sealing with gaskets of the present invention will be substantially less than with a typical embossment with associated bead. Further, with thicker plastic bodies, particularly with thicker fiber reinforced plastic gasket bodies, stress cracking can occur when the entire thickness of narrow portions of the gasket body must move relative to other portions. The cantilever bead arrangement of the gasket of the present invention minimizes this possibility, but in any event provides an effective seal, which, even if stress cracking occurs, acts to seal around an opening independently of the surrounding portions of the gasket.

It will be apparent to those skilled in the art from the foregoing that modifications may be made without departing from the spirit and scope of the present invention. For example, the specific shapes of the sealing bead and the sealing bead portions may be varied to suit the particular application and environment. The plastic used may be varied and may employ fillers appropriate to the particular use and environment. The gaskets may be injection molded or may be formed integrally in other ways appropriate to the gasket and the use to which it is to be put. Accordingly, the invention is not intended to be limited, except as may be required by the appended claims.

What is claimed is:

1. A gasket comprising a thin main gasket body of a synthetic plastic material having a pair of expansive main surfaces and defining a plurality of openings including at least one service opening and a plurality of bolt holes, said gasket body defining a sealing bead which is integral with said body, which is vertically moveable relative to said body, and which surrounds said service opening, each sealing bead comprising a first bead segment projecting outwardly beyond one of said main surfaces and a second bead segment integrally formed with said first bead segment in line with said first bead segment and extending oppositely to said first bead segment, each said sealing bead being formed integrally with said main body via a cantilever section at each side of said sealing bead, each said cantilever section having a thickness no more than about 40 percent of the thickness of said main body and a width which is no less than about 75 percent of the thickness of the cantilever section, whereby when said gasket is clamped and loaded between a pair of flanges, said sealing bead segments cooperate to effect seals with said flanges thereat and said cantilever sections cooperate to provide restorative energy under loading.

2. A gasket in accordance with claim 1, and wherein said cantilever section thickness is no more than about 30 percent of the thickness of said main body.

3. A gasket in accordance with claim 1, and wherein said second bead segment is spaced inwardly of the other main surface by a distance equal to at least 5 percent of the thickness of said main body.

4. A gasket in accordance with claim 1, and wherein said bead height is at least 15 percent greater than the thickness of said main body.

5. A gasket in accordance with claim 1, and wherein said bead segments have free ends which are flat and parallel.

6. A gasket in accordance with claim 1, and wherein said gasket body is generally flat and is of a thickness of at least about 0.04 inch.

7. A gasket in accordance with claim 6, and wherein said gasket is an intake manifold gasket.

8. A gasket in accordance with claim 1, and wherein said gasket is an intake manifold gasket, said main body is generally flat and of a thickness of at least about 0.05 inch, said second bead segment is spaced inwardly of the other main surface by a distance equal to at least 5 percent of the thickness of said main body and said bead height is at last 15 percent greater than the thickness of said main body.

* * * * *